United States Patent
Gillis et al.

(10) Patent No.: US 10,245,700 B2
(45) Date of Patent: Apr. 2, 2019

(54) DEVICES, SYSTEMS, AND METHODS FOR RECOVERY AND RECYCLING OF CARPET COMPONENTS

(71) Applicant: Carpet Processing & Recycling, LLC, Tacoma, WA (US)

(72) Inventors: Terrence Edward Gillis, Tacoma, WA (US); James Lawrence Evans, Puyallup, WA (US)

(73) Assignee: Carpet Processing and Recycling, LLC, Tacoma, WA (US)

( * ) Notice: Subject to any disclaimer, the term of this patent is extended or adjusted under 35 U.S.C. 154(b) by 487 days.

(21) Appl. No.: 14/970,226

(22) Filed: Dec. 15, 2015

(65) Prior Publication Data

US 2016/0176006 A1 Jun. 23, 2016

Related U.S. Application Data

(60) Provisional application No. 62/095,683, filed on Dec. 22, 2014.

(51) Int. Cl.
| | | |
|---|---|---|
| *B24B 7/12* | (2006.01) | |
| *B24B 19/22* | (2006.01) | |
| *B24B 55/06* | (2006.01) | |
| *B29B 17/02* | (2006.01) | |
| *B09B 3/00* | (2006.01) | |
| *B09B 5/00* | (2006.01) | |
| *B29B 17/00* | (2006.01) | |
| *B29L 31/00* | (2006.01) | |

(52) U.S. Cl.
CPC ............. *B24B 19/223* (2013.01); *B09B 3/00* (2013.01); *B09B 5/00* (2013.01); *B24B 7/12* (2013.01); *B24B 55/06* (2013.01); *B29B 17/00* (2013.01); *B29B 17/02* (2013.01); *B29B 2017/0217* (2013.01); *B29L 2031/7322* (2013.01); *Y02W 30/622* (2015.05)

(58) Field of Classification Search
CPC ......... B24B 7/12; B24B 19/223; B24B 55/06; B09B 3/00; B09B 5/00; B29B 17/00; B29B 17/02; B29L 2031/7322
USPC ................................... 451/54, 184
See application file for complete search history.

(56) References Cited

U.S. PATENT DOCUMENTS

| | | |
|---|---|---|
| 2,277,937 A | 3/1942 | Shryer |
| 3,565,257 A | 2/1971 | Cavalieri |
| 3,667,608 A | 6/1972 | Burroughs et al. |
| 3,679,058 A | 7/1972 | Smith |
| 3,690,075 A | 9/1972 | Schoonmaker |

(Continued)

FOREIGN PATENT DOCUMENTS

| | | |
|---|---|---|
| GB | 1 273 534 A | 5/1972 |
| WO | 2012/082785 A2 | 6/2012 |

OTHER PUBLICATIONS

International Search Report and Written Opinion of the International Searching Authority, dated Apr. 13, 2016, for corresponding International Application No. PCT/US2015/065840, 12 pages.

*Primary Examiner* — Eileen Morgan
(74) *Attorney, Agent, or Firm* — Seed IP Law Group LLP

(57) ABSTRACT

Devices, systems and methods for the recycling and recovery of carpet are disclosed herein, including devices, systems and methods for disassembling or deconstructing carpet into the various components that make up the carpet, by abrasive removal and separation of the components.

41 Claims, 9 Drawing Sheets

(56) References Cited

U.S. PATENT DOCUMENTS

| | | | |
|---|---|---|---|
| 3,968,041 A | 7/1976 | De Voss | |
| 4,385,412 A | 5/1983 | Neufeldt | |
| 5,165,821 A | 11/1992 | Fischer et al. | |
| 5,288,349 A | 2/1994 | Fink | |
| 5,439,410 A | 8/1995 | Larsson | |
| 5,535,945 A | 7/1996 | Sferrazza et al. | |
| 5,580,185 A | 12/1996 | Ware | |
| 5,679,247 A | 10/1997 | Burke | |
| 5,704,104 A | 1/1998 | Bacon et al. | |
| 5,722,603 A | 3/1998 | Costello et al. | |
| 5,785,259 A | 7/1998 | Nishibori | |
| 6,029,916 A | 2/2000 | White | |
| 6,035,749 A | 3/2000 | Haselwander | |
| 6,143,172 A | 11/2000 | Rink et al. | |
| 6,182,913 B1* | 2/2001 | Howe | B03B 9/061 241/1 |
| 6,565,022 B1* | 5/2003 | Clements | B02C 4/02 241/159 |
| 6,602,113 B2 | 8/2003 | Lemieux | |
| 6,743,367 B2 | 6/2004 | Dreyer | |
| 6,936,201 B2* | 8/2005 | Desai | B29B 17/0026 264/112 |
| 7,115,671 B2 | 10/2006 | Courage et al. | |
| 8,110,131 B1* | 2/2012 | Dell'Orco | B29B 17/02 264/141 |
| 8,113,448 B2 | 2/2012 | Keating | |
| 8,360,348 B2* | 1/2013 | Levy | B02C 23/02 241/186.35 |
| 8,408,968 B2* | 4/2013 | Gillis | B29B 17/02 451/28 |
| 8,500,047 B2* | 8/2013 | Yu | A47G 27/0437 241/14 |
| 8,794,552 B2* | 8/2014 | Levy | B03B 9/061 241/20 |
| 8,881,628 B2* | 11/2014 | Mosley | B26D 3/28 83/368 |
| 2007/0212531 A1 | 9/2007 | McIntyre et al. | |
| 2011/0040027 A1* | 2/2011 | Keating | B03B 9/061 524/567 |
| 2011/0220293 A1* | 9/2011 | Yu | A47G 27/0437 156/701 |
| 2012/0037734 A1* | 2/2012 | Levy | B02C 18/28 241/24.29 |
| 2012/0149284 A1* | 6/2012 | Gillis | B29B 17/02 451/28 |
| 2012/0291601 A1* | 11/2012 | Mosley | B26D 3/28 83/72 |
| 2013/0112790 A1* | 5/2013 | Rees | B02C 18/0084 241/24.1 |
| 2014/0158276 A1* | 6/2014 | Higgins | A47G 27/0212 156/60 |
| 2014/0186477 A1* | 7/2014 | Dell'Orco | B02C 23/38 425/113 |

* cited by examiner

DEVICES, SYSTEMS, AND METHODS FOR RECOVERY AND RECYCLING OF CARPET COMPONENTS

BACKGROUND

Technical Field

The present disclosure relates generally to the recycling and recovery of carpet. Certain embodiments relate more specifically to devices, systems, and methods for disassembling or deconstructing carpet into the various components that make up the carpet by abrasive removal and separation of the components.

Description of the Related Art

Various devices, systems and methods are known for dissembling or deconstructing carpet into carpet components for recovery of the same, such as, for example, the devices, systems and methods disclosed in U.S. Pat. No. 8,408,968 to Gillis et al., which is incorporated herein by reference in its entirety. Although known devices, systems and methods are generally well suited for dissembling or deconstructing carpet into carpet components, they may nevertheless suffer from one or more drawbacks, such as, for example, limited capacity or throughput.

BRIEF SUMMARY

Embodiments described herein provide devices, systems, and methods for disassembling or deconstructing carpet into carpet components by abrasive removal and separation of carpet components which are particularly efficient, reliable and robust, and which support continuous carpet recovery and recycling efforts.

DETAILED DESCRIPTION

Figure 1A:
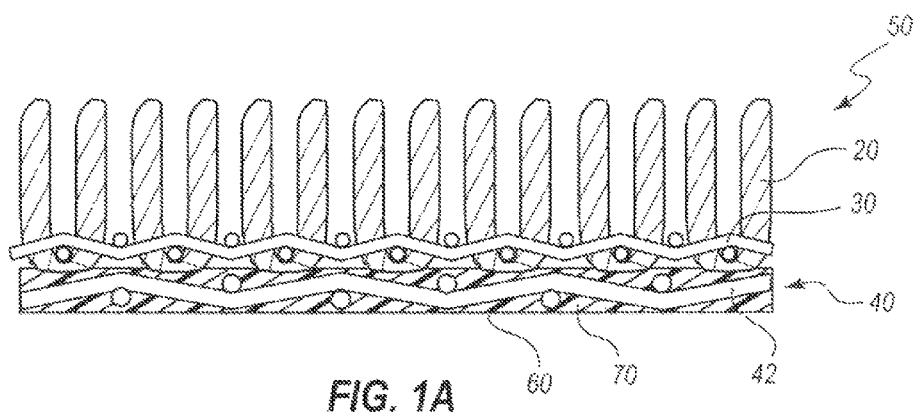
FIG. 1A is a cross sectional view of an exemplary cut pile carpet 50 that may be processed by the methods and systems disclosed herein. This cross sectional view illustrates cut pile face fibers 20 protruding from a primary backing 30 and a secondary backing 40 that is attached to a bottom surface of the primary backing 30.

In the following description, certain specific details are set forth in order to provide a thorough understanding of various disclosed embodiments. However, one of ordinary skill in the relevant art will recognize that embodiments may be practiced without one or more of these specific details. In other instances, well-known structures, devices, features or other aspects associated with dissembling or deconstructing carpet into carpet components may not be shown or described in detail to avoid unnecessarily obscuring descriptions of the embodiments.

Unless the context requires otherwise, throughout the specification and claims which follow, the word "comprise" and variations thereof, such as "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Devices, systems, and methods for recycling carpet 50 are described herein. The methods, systems and devices disclosed are suited to breaking down, dissembling or deconstructing post-consumer carpet 50 into components that have significant value as recycled materials. The methods described herein include separating the material components of the carpet 50 by abrasion. For example, in certain embodiments, pieces of carpet 50 are conveyed beneath one or more abrading units 300*a-c*, the secondary backing 40 of each piece of carpet 50 is removed from the primary backing 30 thereof by abrasion using the one or more abrading units 300*a-c*, the pieces of carpet 50 are conveyed beneath one or more additional abrading units 300*d-f* and face fibers 20 of each piece of carpet 50 are abrasively stripped from the primary backing 30. In such embodiments, the face fiber 20, the primary backing 30 and the secondary backing 40 materials can be isolated during the recycling process and, if desired, further processed for use as post-consumer materials.

Figure 1B:
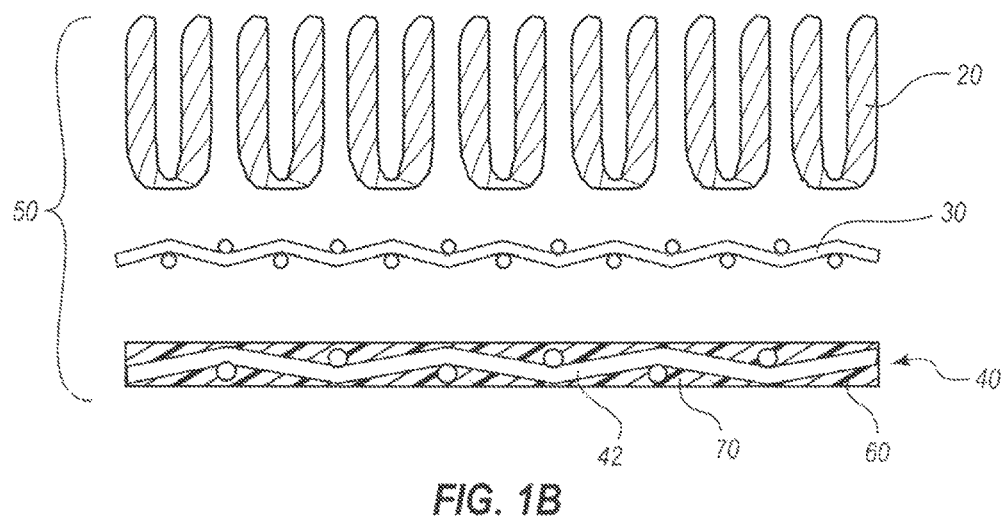
FIG. 1B is a further illustration of the primary components of the cut pile carpet 50 depicted in FIG. 1A.
Figure 2:
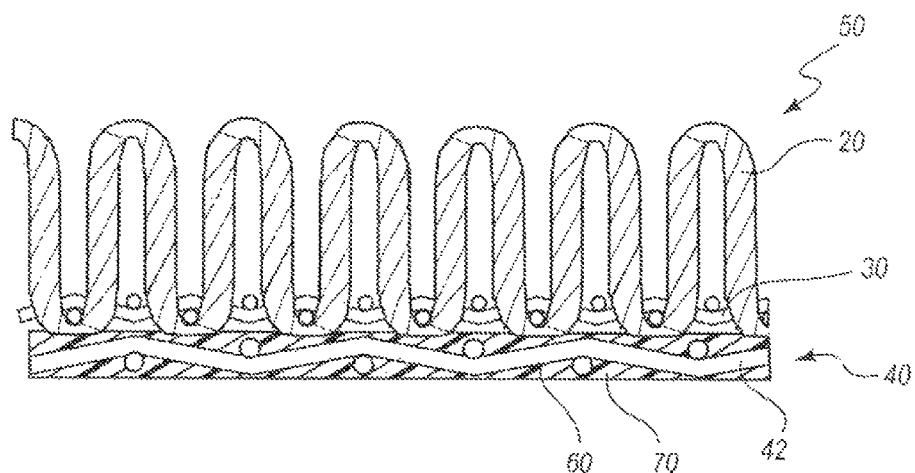
FIG. 2 is a cross sectional view of an exemplary loop pile carpet 50 that may be processed by the methods and systems disclosed herein. This cross sectional view illustrates loop pile face fibers 20 protruding from a primary backing 30 and a secondary backing 40 that is attached to a bottom surface of the primary backing 30.
Figure 3:
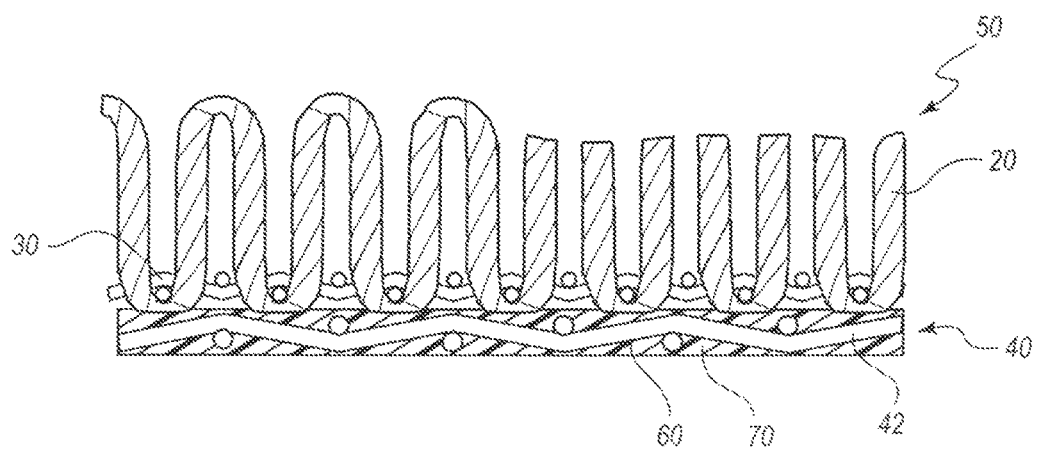
FIG. 3 is a cross sectional view of an exemplary carpet 50 with loop pile and cut pile face fibers 20 that may be processed by the methods and systems disclosed herein.

FIGS. 1 through 3 illustrate cross sectional views of cut pile and loop pile carpets 50 that can be processed by the methods and systems for carpet recycling described herein. The carpets 50 shown in FIGS. 1 through 3 include cut pile face fibers 20 or loop pile face fibers 20, a primary backing 30, and a secondary backing 40. These carpets 50 include a plurality of cut pile face fibers 20 or loop pile face fibers 20 protruding from the top surface of the primary backing 30. The secondary backing 40 forms the bottom surface of the carpet 50, is adhered or connected to the primary backing 30, and includes one or more fillers 60 and one or more adhesives 70.

The term "face fibers" refers to fibers or yarns made of any one of a number of types of materials, such as, for example, acrylics, nylons, polypropylene, polyethylene, polyamides, polyesters, wool, cotton, rayon, and the like, that are or can be used to form the pile of a cut pile or loop pile carpet 50.

The term "primary backing" is used herein to refer to a woven or non-woven fabric made of one or more natural or synthetic fibers or yarns such as wool, polypropylene, polyethylene, ethylene-propylene copolymers, polyesters, rayon, and the like. The face fibers 20 of the carpet 50 are affixed to and/or through the primary backing 30.

The term "secondary backing" is used herein to refer to woven or non-woven fabrics made of one or more natural or synthetic fibers or yarns such as, for example, wool, polypropylene, polyethylene, ethylene-propylene copolymers, polyesters, rayon, jute and the like. The secondary backing 40 is generally affixed or adhered to the primary backing 30.

The terms "filler" and "fillers" are used herein to refer to substances such as calcium carbonate, glass, coal fly ash, bauxite, calcium sulfite, and the like, which are suitable for use in the manufacture of carpets 50.

The terms "adhesive" and "adhesives" are used herein to refer to substances such as latex and the like, which are suitable for use in the manufacture of carpets 50.

The methods described herein comprise breaking down carpet 50 into its primary components by abrasion. As used herein, "primary component" refers to any of the face fiber 20, the primary backing 30, and the secondary backing 40. The term "abrasion" refers to any technique, process, or technology involving the application of an abrasive to the surface of a material with a mechanical force sufficient to abrade, grind, strip, pull, or otherwise remove the designated component, surface, or layer. For purposes of the present disclosure, "abrasion" includes any sanding or grinding technique, process, or technology suitable for use in the methods described herein for separating carpet 50 into its primary component materials. In certain embodiments, abrasion as contemplated for the methods described herein is carried out using one or more abrasive drums 200a-f (collectively 200), although other abrading or grinding mechanisms are contemplated. In some instances, the abrasive drums 200a-f may include abrasive material 205 adhered, affixed, embedded or otherwise coupled thereto. The abrasive material 205 may be, for example, a suitable, commercially available abrasive product, such as sandpaper, abrasive cloth, abrasive particles, hook and loop roll abrasive cloth, and the like. In some embodiments, abrasive particles may be applied to, adhered to, or embedded within the external surface of the drums 200a-f for use in abrasion as contemplated for the methods described herein. In other embodiments, abrasive particles may be applied to, adhered to, or embedded within the surface of a removable sleeve that can slide or be disposed over the surface of the drums 200a-f for use as an abrasive material 205.

In the methods described herein, pieces of carpet 50 to be recycled are provided, the secondary backing 40 is removed by abrasion applied to one side of carpet 50, and the face fibers 20 are then stripped or plucked from the primary backing 30 by abrasion applied to the other side of the carpet 50. Removal of the secondary backing 40 may include removal of all or substantially all of a base portion of the face fibers 20. More particularly, all or substantially all of the base of "U" shaped face fibers 20 may be removed in the process of removing the secondary backing 40 via abrasion to facilitate the subsequent stripping or plucking of the face fibers 20 from the remaining primary backing 30. Once deconstructed, the materials forming the primary components may be separately collected for recycling. Therefore, by facilitating the separate collection of the materials forming each of the primary components, the methods described herein greatly facilitate collection of the individual components for recycling, minimize cross-contamination of the recovered materials, and reduce or eliminate the need for further processing of primary component materials prior to their subsequent sale, transport, or use.

In some embodiments, the pieces of carpet 50 to be recycled may be cleaned or remediated prior to abrasively breaking down the pieces of carpet 50 into their primary components. In some embodiments, the pieces of carpet 50 may be sized and/or sorted prior to abrasive deconstruction. For example, in some embodiments, the pieces of carpet 50 may be graded according to the nature of the face fiber 20 as part of the recycling process. Grading the pieces of carpet 50 in this manner reduces the possibility of cross-contamination of face fiber 20 materials recovered from the methods described herein. For example, a system for carrying out the methods described herein may be dedicated to recycling carpets 50 having a certain type or class of face fibers 20. Alternatively, a system may be used for recycling carpets 50 having any type of face fiber 20, but the carpets 50 may be graded, grouped, and processed according to face fiber 20 type so that different types of face fibers 20 can be collected with little or no contamination with face fibers 20 of a different material.

In certain embodiments, the materials forming the primary components may be further processed to facilitate their sale, transportation, or use as post-consumer recycled materials. For instance, the materials may be washed, or otherwise cleaned, densified, pelletized, baled, etc. Moreover, in some embodiments, the primary component materials may be handled or processed to isolate or produce secondary component materials. For example, the secondary backing 40 may include fiber 42, adhesive 70, and filler 60 materials, and once separated from the carpet 50, the material forming the secondary backing 40 may be collected and processed in a manner that isolates one or more secondary component materials (e.g., one or more of the fiber 42, adhesive 70, or filler material 60 recovered from the secondary backing 40). Therefore, in certain embodiments of the methods described herein, the material recovered from the secondary backing 40 is processed to isolate one, or more, or each of the adhesive 70, filler 60, and fiber 42 materials making up the secondary backing 40. For example, the material recovered from the secondary backing 40 may be further processed using a hammer mill, attrition mill or shredder before being separated using a vibratory screen, air cyclone, hydro cyclone, float/sink tank or other suitable separation device or devices configured for use in this context.

To facilitate abrasive removal of the secondary backing 40 and subsequent stripping of the face fibers 20 from the primary backing 30, in certain embodiments of the methods described herein, one or more screed devices 204a-f are provided to ride on the surface of the carpet 50 to prevent significant displacement or distortion of the pieces of carpet 50 upon application of abrasive forces thereto and in some instances, to assist in maintaining a desired depth of abrasion. As used herein, a "significant" displacement or distortion of the pieces of carpet 50 would include any condition, such as large wrinkles or folds, which would prevent the abrasive device(s) (e.g., high speed abrasive drums 200a-f) from making full and flat contact with the pieces of carpet 50 during processing.

Figure 4:
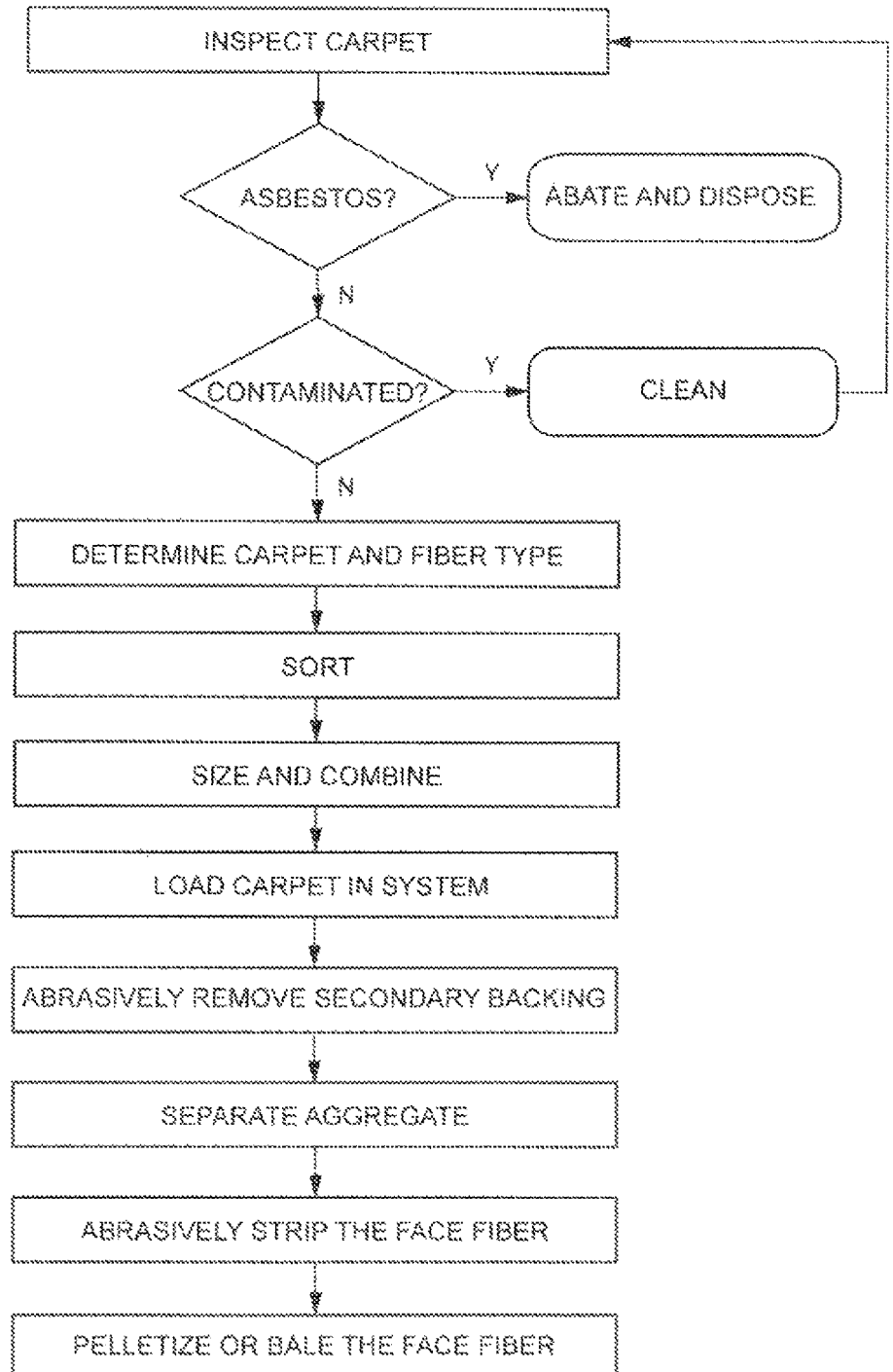
FIG. 4 is a flowchart illustrating an embodiment of the methods for carpet recycling described herein.

FIG. 4 is a flowchart schematically illustrating an embodiment of the methods for recycling carpet 50 as described herein. The method may start with inspection of a plurality of carpet pieces 50 to determine if a hazardous contaminant, such as, for example, asbestos, is present. If a hazardous material is present, steps can be taken to abate the hazardous material and, if needed, properly dispose of one or more of the pieces of carpet 50 without further processing. If a hazardous material is not present, the pieces of carpet 50 may be checked for other non-hazardous contaminants and cleaned, if necessary. If the pieces of carpet 50 are cleaned to remove contaminants, the pieces of carpet 50 may be re-inspected after cleaning to ensure that all contaminants are sufficiently removed before further processing.

Once it is confirmed that the pieces of carpet 50 are free of hazardous material and sufficiently clean, the face fiber type of the pieces of carpet 50 may be determined so as to properly sort the pieces of carpet 50 for further processing. The face fiber type of the pieces of carpet 50 may be determined using commercially available tools and systems such as a micro-fiber carpet analyzer, such as a Polychromix Phazir™ analyzer, and the like. Once sorted according to the type of face fiber 20, the pieces of carpet 50 may be measured and combined according to size in preparation for the abrasive breakdown of the pieces of carpet 50. As described herein, the secondary backing 40 is removed by abrasion. In particular embodiments described herein, once the secondary backing 40 is removed, the face fibers 20 are removed by abrasion. Removal of the secondary backing 40 prior to removal and separation of the face fibers 20 eases recovery of the face fibers 20, allows recovery of face fibers 20 that are substantially free of contaminant materials from the secondary backing 40, and can simplify collection of the primary backing 30. For example, abrasive removal of the secondary backing 40 followed by abrasive removal of the face fibers 20 results in a primary backing 30 that is substantially intact and substantially or completely free of face fiber 20 or secondary backing 40 materials.

Figure 5:
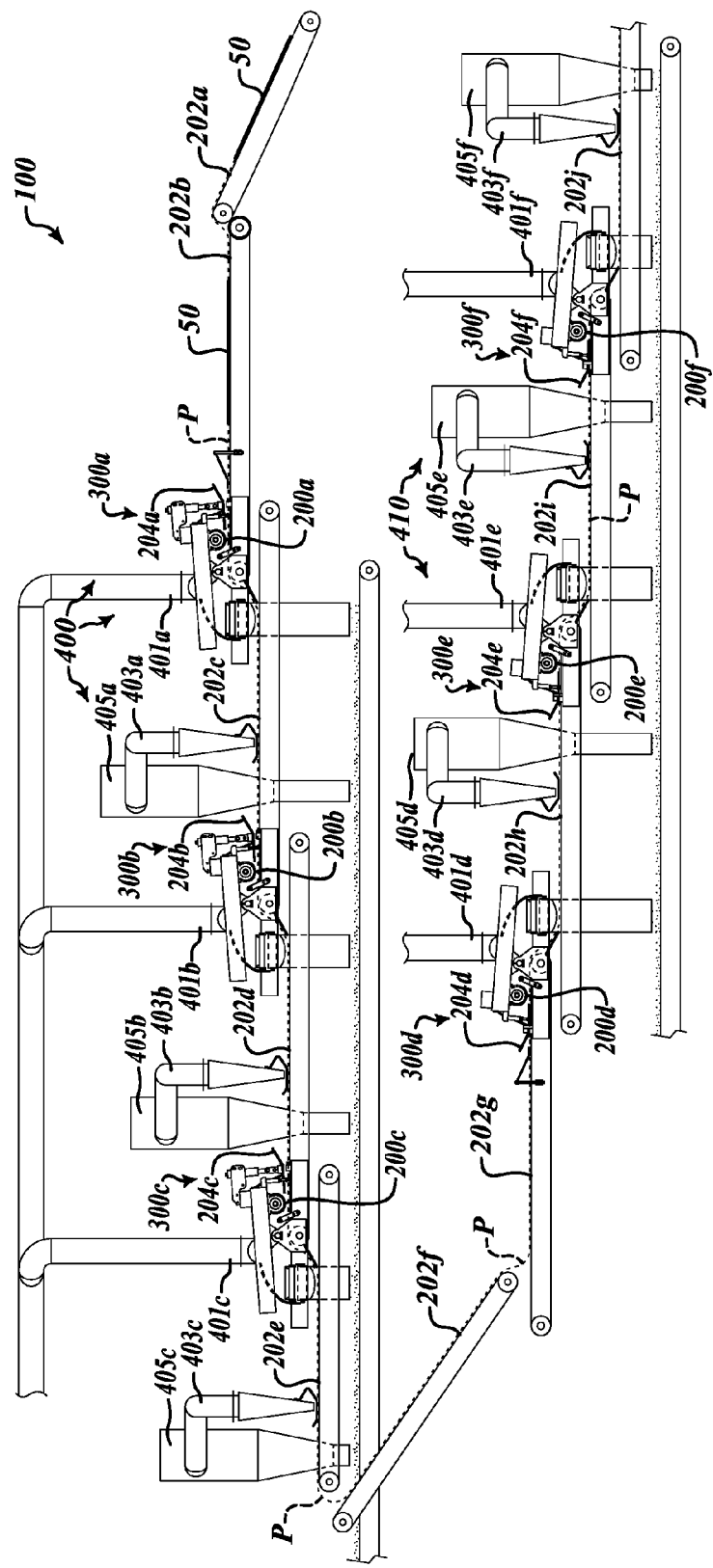
FIG. 5 is a side elevational view of a carpet recycling system 100, according to one example embodiment, illustrating a plurality of abrading units 300*a-f* for removing material from pieces of carpet 50 as the pieces of carpet 50 are conveyed beneath high speed abrasive drums 200*a-f* thereof.
Figure 6A:
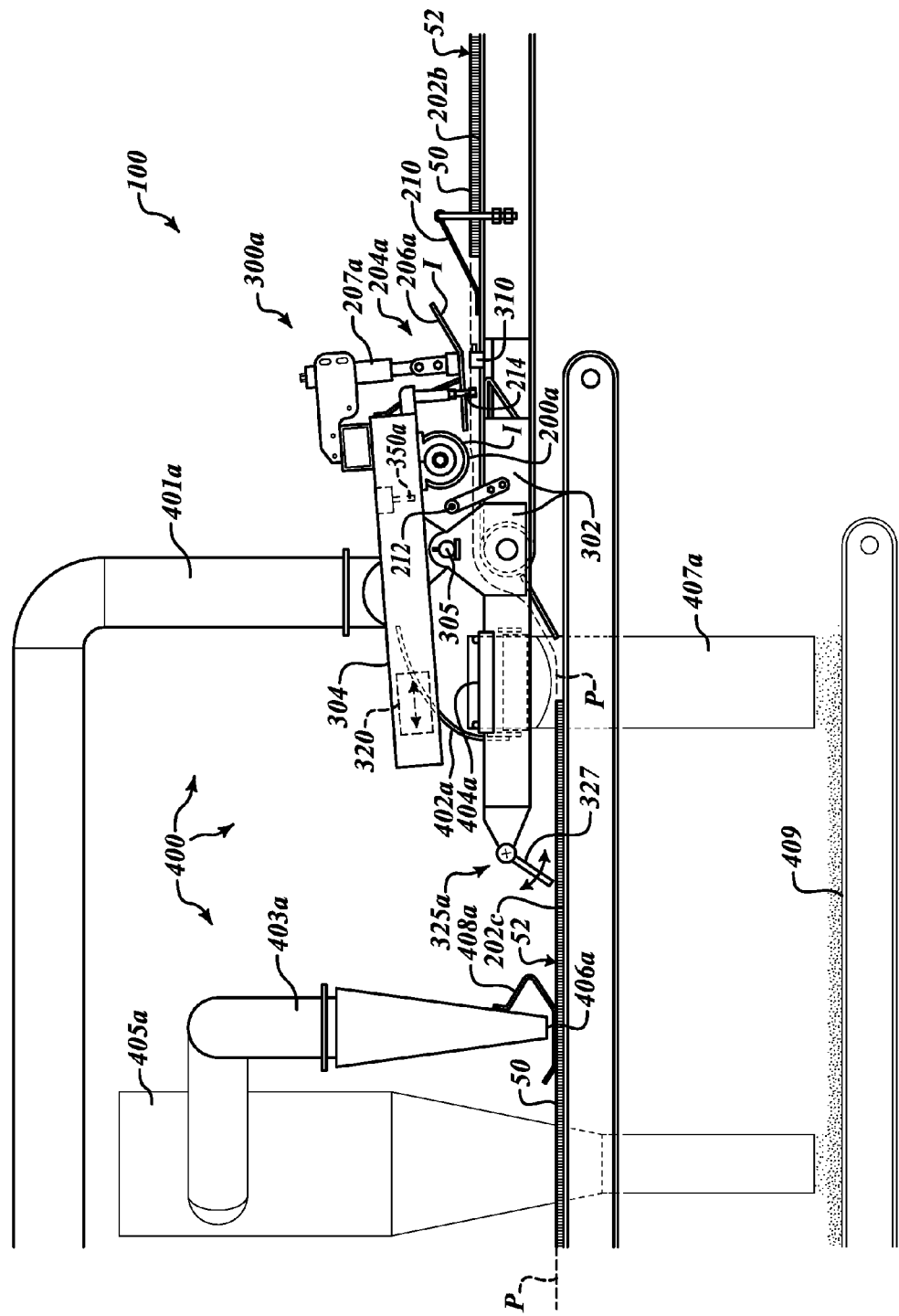
FIG. 6A is a side elevational view of a portion of the system 100 of FIG. 5 illustrating a first abrading unit 300*a* including a first high speed abrasive drum 200*a* and a first screed device 204*a* in an inactive configuration I.
Figure 6B:
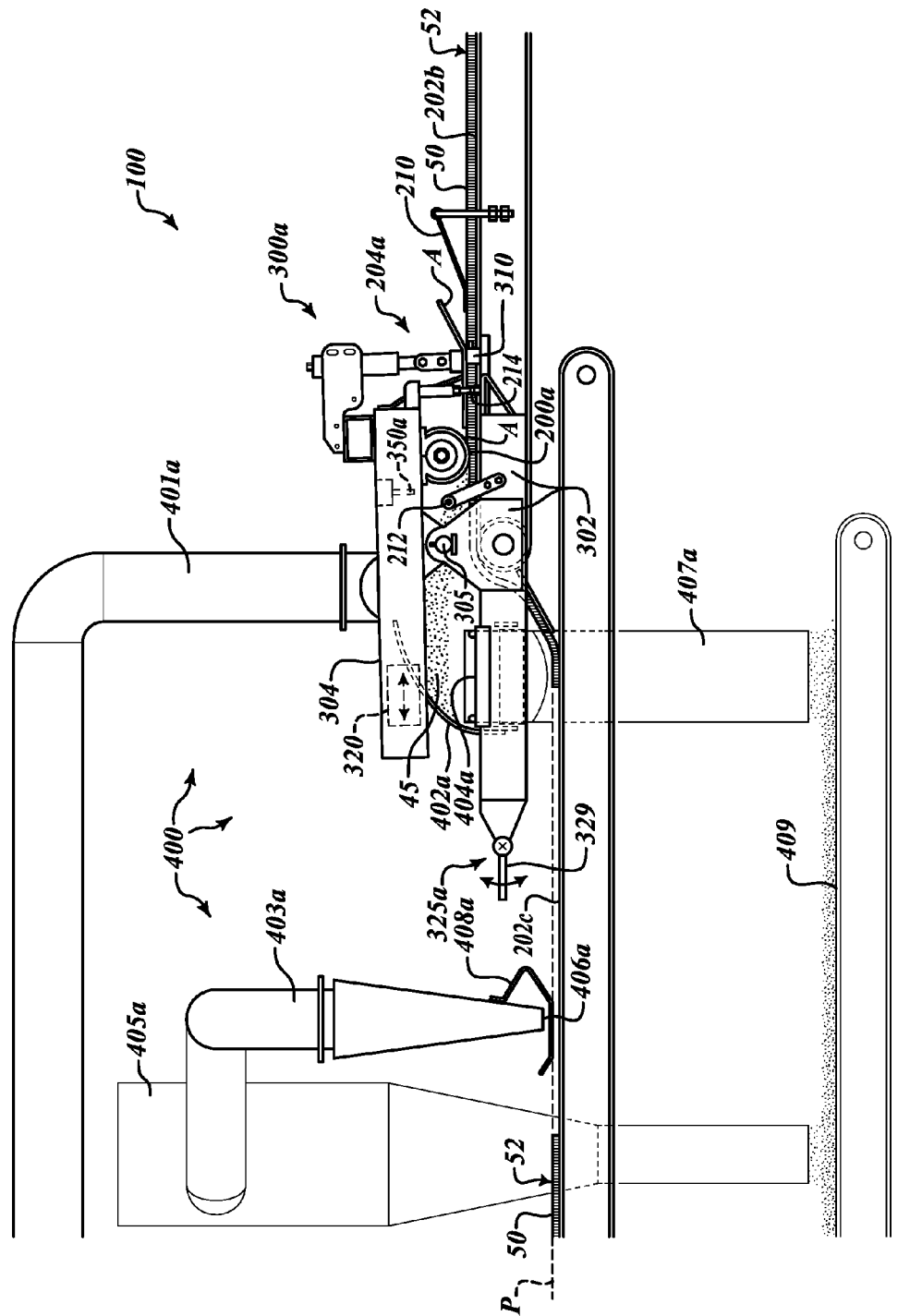
FIG. 6B is a side elevational view of the portion of the system 100 of FIG. 6A illustrating the first abrading unit 300*a* in an active configuration A.
Figure 7:
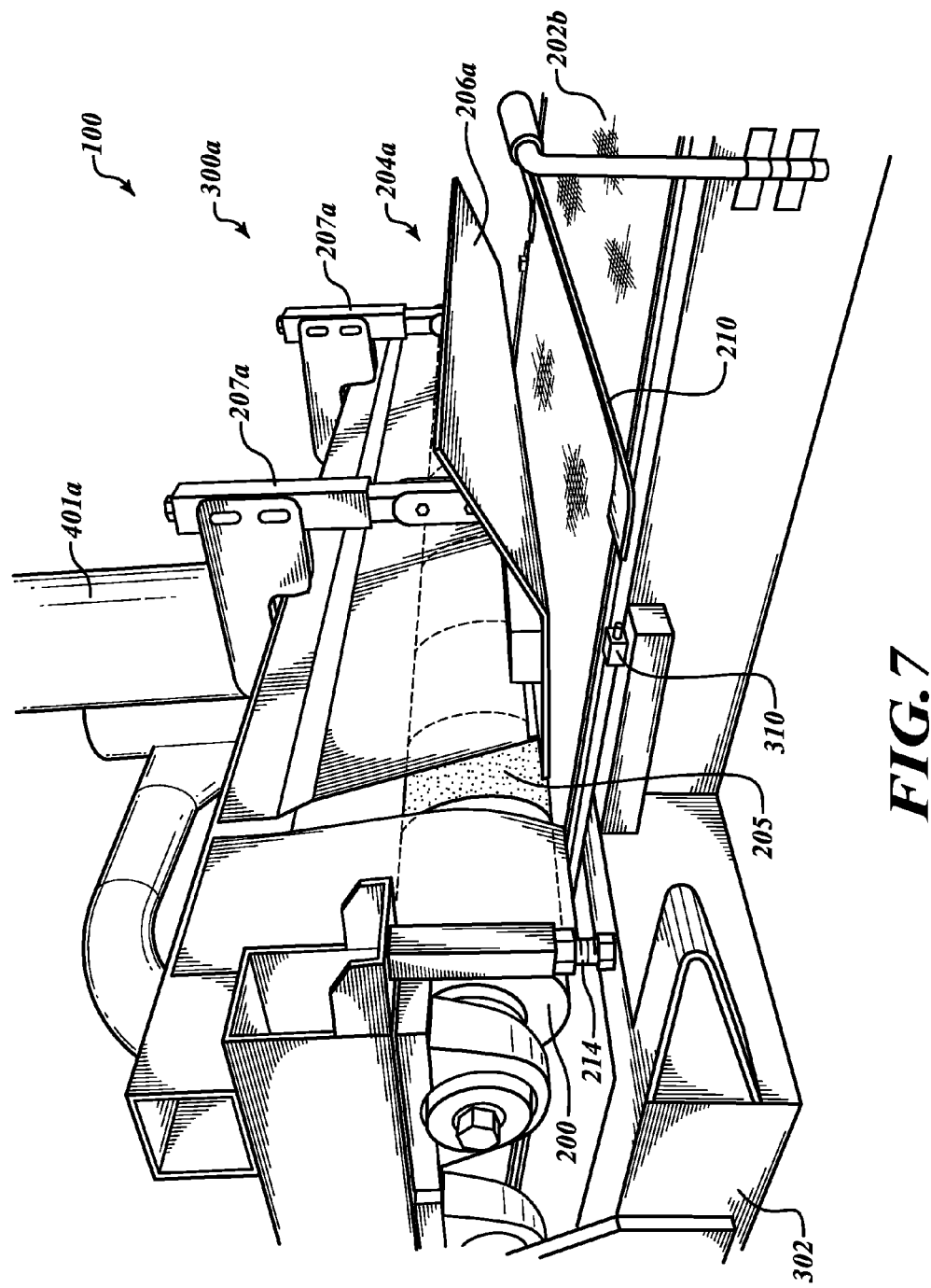
FIG. 7 is a perspective view of a portion of the system 100 of FIG. 5 illustrating the first abrading unit 300*a* in the inactive configuration I.

Embodiments of devices and systems suited to recycle carpet 50 according to the methods described herein are illustrated in and described in association with FIGS. 5 through 7. Though the methods and systems described herein are illustrated in particular with reference to FIGS. 5 through 7, it is to be understood that the methods and systems described herein are not limited to the embodiments illustrated. For example, mechanical devices different than those specifically illustrated herein for deconstructing the carpet pieces 50 may be provided.

The system 100 illustrated in FIGS. 5 through 7 includes a plurality of moving platforms 202a-j, such as flatbed conveyors, which define a processing path P of the pieces of carpet 50 to be processed by the system 100. The moving platforms 202a-j may include a highly textured surface to assist in ensuring little to no relative movement between the conveyed carpet 50 as the pieces of carpet 50 are processed. The system 100 also includes a plurality of high speed abrasive drums 200a-f located adjacent the processing path P for abrading the pieces of carpet 50. The pieces of carpet 50 are loaded or fed into the system 100 and conveyed along the processing path P. A plurality of screed devices 204a-f are also positioned along the processing path P including a first screed device 204a located upstream of a first high speed abrasive drum 200a for successively engaging and/or riding on each successive piece of carpet 50 and urging the piece of carpet 50 into the moving platforms 202b-d, 202g-i on which the pieces of carpet 50 are conveyed beneath the high speed abrasive drums 200a-f. The high speed abrasive drums 200a-f may be applied against the carpet 50 to abrasively separate the carpet 50 into its primary component materials.

As an example, one or more of the high speed abrasive drums 200a-c may be applied against the carpet 50 to remove the secondary backing 40 from the primary backing 30. The aggregate mixture 45 (e.g., abraded secondary backing fibers 42, adhesives 70, and fillers 60) removed from the carpet 50 is collected by a collection system 400, which may include one or more vacuum systems 401a-c, 403a-c, catch arrangements 402a (FIGS. 6A and 6B), conveyance systems 404a (FIGS. 6A and 6B), filters, cyclone systems 405a-c, vibratory screens, and/or other devices for collecting or capturing the aggregate mixture 45. The collection system 400 may be used to further separate the aggregate mixture 45 into its secondary components. After removing the secondary backing 40, the carpet 50 may be turned over and one or more of the high speed abrasive drums 200d-f may be applied against the face fibers 20 to separate the face fibers 20 from the primary backing 30. Similarly, the face fibers 20 separated from the primary backing 30 may be collected by a collection system 410, which may include one or more: vacuum systems 401d-f, 403d-f, catch arrangements, conveyance systems, filters, cyclone systems 405d-f, vibratory screens, face fiber packing systems, pelletizer systems, and/or other devices for collecting or capturing the face fibers 20. Once the secondary backing 40 and the face fibers 20 are removed, the primary backing 30 may be discharged from the system 100. At this point, the primary backing 30 may be essentially free of secondary backing 40 and face fiber 20 materials. The primary backing 30 can then be collected by any suitable means and processed, as desired, for sale, transportation, or use.

FIGS. 6A and 6B illustrate a side view of a portion of the system 100 including a first abrading unit 300a having a first high speed abrasive drum 200a and a first screed device 204a, the abrasive drum 200a and the screed device 204a shown in an inactive configuration I and an active configuration A, respectively. Shown in FIGS. 6A and 6B is a portion of a machine frame 302 and a support structure 304 movably coupled to the machine frame 302 to support the first high speed abrasive drum 200a and enable the first high speed abrasive drum 200a to be moved into and out of the active position A for abrading the pieces of carpet 50 as they pass beneath the first high speed abrasive drum 200a. Also shown in FIGS. 6A and 6B is a first moving platform 202b for moving the pieces of carpet 50 along the processing path P beneath the first high speed abrasive drum 200a. The support structure 304 is shown as being pivotally coupled to the machine frame 302 to pivot the first high speed abrasive drum 200a about a first axis 305 into and out of the active position A and to pivot the screed device 204a into and out of contact with the pieces of carpet 50 as they pass beneath the first high speed abrasive drum 200a. A sensor 310, such as a laser interrupt sensor, is provided to sense a position of each piece of carpet 50 as it approaches the first high speed abrasive drum 200a. The sensor 310 is coupled to a control system (not shown) which receives a signal indicative of the position of the piece of carpet 50 and, based at least in part on the received signal, controls a cylinder or other actuator device (not shown) to move the first high speed abrasive drum 200a into the active position A, as shown in FIG. 6B, and to pivot the screed device 204a into contact with the piece of carpet 50 to ride on the surface 52 of the carpet 50 as it is abraded.

The screed device 204a is configured to ride on the carpet 50 and urge the carpet 50 into contact with the platform 202b as the surface of the carpet 50 is simultaneously abraded by the high speed abrasive drum 200a, and is positioned relative to the high speed abrasive drum 200a and the platform 202b to create tension in the carpet 50 in a region between the screed device 204a and the high speed abrasive drum 200a as the high speed abrasive drum 200a engages the surface 52 of carpet 50 to remove material therefrom, which assists in preventing folding, wrinkling or other distortions of the carpet 50 during processing and preventing the carpet 50 from moving relative to the moving platform 202b upon which it is transported under the high speed abrasive drum 200a. The magnitude of the tensile force generated within the carpet 50 by the simultaneous interaction or the screed device 204a and the high speed abrasive drum 200a may vary depending on the size and nature of the carpet 50 to be recycled. The tension may also be adjustable, such as, for example, by loading the screed device 204a with additional mass or otherwise increasing the mass of the screed device 204a such that it applies greater pressure to the surface 52 of the carpet 50.

With reference to FIGS. 6A, 6B and 7, the screed device 204a may include a flat plate or platen 206a that is configured to contact the surface 52 of the carpet 50 in a flat manner. The plate or platen 206a may have a leading edge or lip that is uplifted or inclined to assist in enabling the carpet 50 to slide under the plate or platen 206a during operation. The plate or platen 206a of the screed device 204a may be connected to the support structure 304 via one or more adjustable struts 207a, legs or other devices to enable the height of the plate or platen 206a to be adjusted relative to the high speed abrasive drum 200a. The adjustable struts 207a, legs or other devices may include an adjustable lead screw, telescoping member, hydraulic or pneumatic cylinder or other mechanical actuator or device for enabling such height adjustment. In some embodiments, one or more adjustment devices may be provided for coarse adjustments as well as fine adjustments. As described earlier, a sensor 310, such as a laser interrupt sensor, may be provided to sense a position of each piece of carpet 50 as it approaches and trigger a cylinder or other actuator device (not shown) to move the screed device 204a into contact with the piece of carpet 50 to ride on the surface 52 of the carpet 50 as it is abraded by the high speed abrasive drum 200a, as shown in FIG. 6B. Although the screed device 204a is shown as being coupled to the frame 302 by the support structure 304 to pivot about axis 305, in other instances, the screed device 204a may be configured to move relative to the platform 202b in other ways, such as, for example, via a planar four bar linkage or other kinematic arrangement. In some instances, the screed device 204a may be movably coupled to the frame 302 apart from the high speed abrasive drum 200a such that it may be moved independently of the high speed abrasive drum 200a. In still other instances, the screed device 204a may be fixedly secured to the frame at a desired fixed height, as shown, for example, in the abrading units 300d-f illustrated in FIG. 5.

With continued reference to FIGS. 6A, 6B and 7, the system 100 may further include one or more hold down devices 210 coupled to the frame 302 in the vicinity of the edges of a belt of the moving platform 202b. The hold down devices 210 may assist in maintaining the lateral edge regions of the belt of the moving platform 202b in a particularly flat condition so as to not come into contact with the high speed abrasive drum 200a while it abrades the carpet and to help ensure the carpet 50 remains in a particularly flat condition as it moves along the processing path P. The hold down devices 210 may urge the edges of the belt into contact with an underlying structure on the force of gravity. They may also be configured to pivot away from the platform 202b if encountered by the carpet 50 during operation, as illustrated in FIG. 6B.

With continued reference to FIGS. 6A, 6B and 7, the system 100 may further include a vacuum arrangement 401a coupled to the abrading unit 300a to remove dust, debris or other particles generated during the abrasion process from within a hood or general enclosure overlying the high speed abrasive drum 200a to maintain a relatively clean operating environment.

With reference to FIGS. 6A and 6B, the first abrading unit 300a may further include a movable counterweight 320 coupled to the support structure 304 for selectively adjusting an amount of pressure with which the screed device 204a urges the carpet 50 into contact with the moving platform 202b. For example, the counterweight 320 may be located at an aft end of the support structure 304 and moved away from the first axis 305 to reduce the pressure with which the screed device 204a urges the carpet 50 into the moving platform 202b and may be moved toward the first axis 305 to increase the pressure. In this manner, the pressure may be adjusted to provide a downwardly applied force or pressure sufficient to reduce or eliminate significant displacement or distortion of the carpet 50 as it is abraded by the downstream abrasive drum 200a.

With reference again to FIG. 5, the system 100 may include a series of successive abrading units 300a-f and a cascading series of moving platforms 202b-d, 202g-i that at least in part define the processing path P. For example, the system 100 may include a first grouping of three separate abrading units 300a-c and three cascading moving platforms 202b-d that transport the pieces of carpet 50 beneath the abrading units 300a-c. In operation, each of the abrading units 300a-c may be used to collectively remove the secondary backing 40 via successive abrading activities. The height of the abrasive device (e.g., the high speed abrasive drum 200) of each abrading unit 300a-c relative to the moving platform 202b-d beneath each abrasive device may be set at the same or a different height during operation. For instance, in some embodiments, the height may gradually decrease with each successive abrading operation such that the secondary backing layer 40 is gradually removed. In other instances, the height of each abrasive device may be held generally constant. Height adjustment may be provided, for example, via one or more adjustable struts 207a, legs or other devices coupled to the plate or platen 206a of the screed devices 204a-c when configured to move in unison with the abrasive devices (e.g., high speed abrasive drums 200a-c). In other instances, an adjustable or non-adjustable stop 214 (FIGS. 6A and 6B) may be provided to set or control a height of the abrasive devices and corresponding depth of abrasion. The adjustable or non-adjustable stop 214 may also serve to limit travel or provide a safety stop when the height of the abrasive devices is otherwise controlled or set by the screed devices 204a-c.

A first grouping of the abrading units 300a-c may be configured to abrade the backing layer 40 of the carpet 50 and a second grouping of the abrading units 300d-f may be configured to abrade the face layer (e.g., face fibers 20) after the backing layer 40 is substantially or completely removed. For example, a grouping of two or more upstream abrading units 300a-c may be provided to successively remove the secondary backing layer 40 via abrasion and a grouping of two or more downstream abrading units 300d-f may be provided to successively remove the face layer via abrasion after the secondary backing layer 40 is substantially or completely removed. Again, removal of the secondary backing layer 40 may include removal of all or substantially all of a base portion of the face fibers 20. More particularly, all or substantially all of the base of "U" shaped face fibers 20 may be removed in the process of removing the secondary backing layer 40 via abrasion to facilitate the subsequent stripping or plucking of the face fibers 20 from the remaining primary backing 30.

One or more material handling devices 202e, 202f may be provided to flip the pieces of carpet 50 over after abrasive removal of the secondary backing layer 40 such that the face layer (e.g., face fibers 20) are oriented face up as the pieces of carpet 50 continue toward the second grouping of abrading units 300d-f for removal of the face layer. In some embodiments, the first grouping of abrading units 300a-c may be provided above the second grouping of abrading units 300d-f to reduce the footprint of the system 100. In other instances, one system may be provided for removing the secondary backing layer 40 and a separate system may be provided for removing the face layer (e.g., face fibers 20). In such instances, the pieces of carpet 50 may be processed in batches to remove the secondary backing layer 40 and then transported to the separate system for removal of the face layer (e.g., face fibers 20). In addition, although the system 100 shows three abrading units 300a-c for abrading the secondary backing layer 40 and three abrading units 300d-f for abrading the face layer or face fibers 20, it is appreciated that more or fewer abrading units may be provided for each activity.

With reference again to FIGS. 6A and 6B, the system 100 may further include at least one device 325a positioned downstream of the first abrading unit 300a in the vicinity of the moving platform 202c associated with a second one of the abrading units 300b, which is movable between an active position 327, in which the device assists in flattening out the carpet 50 as the carpet passes by the device 325a, as shown in FIG. 6A, and an inactive position 329, in which the device 325a is positioned away from the moving platform 202c associated with the second abrading unit 300b so as to not interfere with the carpet 50 as it passes by the device 325a, as shown in FIG. 6B. The device 325a may comprise, for example, a series of flexible fingers or brush members that extend transversely across a width of the moving platform 202c. The flexible fingers or brush members may be connected to a common shaft and may rotate in unison when moving between the active position 327, shown in FIG. 6A, and the inactive position 329, shown in FIG. 6B. Movement of the device 325a may be provided by a cylinder or other actuator which is controlled in coordination with movement of the high speed abrasive drum 200a and/or in coordination with movement of the pieces of carpet 50.

With continued reference to FIGS. 6A and 6B, the first abrading unit 300a may be provided with a catch arrangement 402a positioned aft of the abrasive device to collect material abraded from the carpet 50 and a conveyor device 404a that is positioned adjacent the catch arrangement 402a to receive the collected material from the catch arrangement 402a. The catch arrangement 402a may include, for example, a deflection member that is positioned and shaped to deflect or otherwise route material impinging thereon toward the conveyor device 404a. The catch arrangement 402a may be located aft of the abrasive device (e.g., high speed abrasive drum 200a) to catch a majority or substantial portion of the material that is removed via abrasion and flung or propelled toward the catch arrangement 402a by the abrasive device. The conveyor device 404a may be, for example, a flatbed conveyor and may be arranged to route the collected material in a direction transverse to a conveyance direction of the carpet 50. The conveyor device 404a may move the collected material (i.e., the aggregate mixture 45) toward a chute 407a or other routing apparatus for downloading to a common conveyor 409, which may be used to guide the collected aggregate mixture 45 downstream for further processing.

The first abrading unit 300a may further include a series of nozzles 350a located aft of the abrasive device (e.g., high speed abrasive drum 200a) in a position to discharge a respective gas stream to impinge on a leading end of the carpet 50 as the leading end clears the abrasive device. The nozzles 350a may be coupled to a pressurized gas source via one or more valves that may be controlled by a control system to coordinate discharging of the gas streams with movement of the pieces of carpet 50 along the processing path P. The discharged gas streams may assist in keeping the pieces of carpet 50 spread out flat on the moving platform 202b as the leading end of the carpet 50 clears the abrasive device and in preventing the carpet 50 from being drawn around or entangled in the abrasive device. Additionally, an elongated guide 212, such as a cylindrical bar, may be located aft of the abrasive device (e.g., high speed abrasive drum 200a) in a position to assist in preventing the leading end of the carpet 50 from lifting off the moving platform 202b and becoming entangled in the abrasive device.

With continued reference to FIGS. 6A and 6B, the system 100 may further include a vacuum system 403a positioned downstream of the abrasive device to remove any remaining loose material from the abraded surface of the carpet 50 as it passes beneath an inlet 406a of the vacuum system 403a. The vacuum system 403a may include a grate structure 408a adjacent the inlet 406a to prevent the carpet 50 from separating from the moving platform 202c upon which the carpet 50 is transported. The grate structure 408a may include, for example, a series of rods that are bent to form a structure that assists in feeding a leading end of the carpet beneath the inlet 406a to the vacuum system 403a and keeping the carpet 50 from thereafter coming in contact with the inlet 406a. The vacuum system 403a may be provided as a supplemental collection system that is in addition to the aforementioned catch arrangement 402a and conveyor device 404a. The vacuum system 403a may collect a minority portion of the aggregate mixture 45 that is removed from the carpet 50 via abrasion. The aggregate mixture 45 collected by the vacuum system 403a may be routed to a cyclone separator device 405a and routed to the common conveyor 409 described earlier.

In some instances, the vacuum system 403a may be activated and deactivated in coordination with movement of the carpet 50 beneath the inlet 406a and grate structure 408a. For example, as the leading edge of each piece of carpet 50 enters the vacuum pick-up location beneath the inlet 406a and grate structure 408a, the vacuum system 403a may be temporarily deactivated to prevent the leading edge from becoming disturbed by the vacuum system 403a, which might otherwise lead to significant rolls or wrinkles in the carpet 50 that hinder the recycling process. The vacuum system 403a may be reactivated after the leading edge of each piece of carpet 50 exits the vacuum pick-up location to start suctioning loose aggregate mixture 45 from the surface of the carpet 50. For this purpose, each of the vacuum systems 403a-403c may include one or more gate structures for controlling the vacuum generated by each system. The gate structures may include, for example, pneumatic blast gates, such as, for example, those sold by The Blastgate Company of Washington Township, Mich. The timing of the actuation of the blast gates may be provided via the aforementioned sensor 310 (e.g., laser interrupt sensor) and control system. In other instances, a separate position sensor (not shown) may be provided to sense a position of each piece of carpet 50 as it approaches a respective vacuum pick-up location. The sensor(s) may be communicatively coupled to the control system (not shown), which receives a signal indicative of the position of the piece of carpet 50 and, based at least in part on the received signal, controls a cylinder or other actuator device (not shown) to move the gate structure to activate and deactivate the vacuum as desired.

In some embodiments, the high speed abrasive drums 200a-f may be fitted with a pressure-maintaining mechanism (not shown) to maintain a substantially even pressure against the carpet 50 sufficient to effectively separate the secondary backing 40 and/or face fibers 20 from the primary backing 30. Examples of such pressure-maintaining mechanisms may include pneumatic cylinders, coil spring mechanisms, hydraulic cylinders, and the like.

The rotational speed of the high speed abrasive drums 200a-f, the pressure applied by the high speed abrasive drums 200a-f and/or screed devices 204a-f against the carpet 50, and the speed of the moving platforms 202a-j may be adjusted so as to minimize or prevent uneven or inconsistent removal and isolation of the individual components of the carpet 50 being recycled. For example, one or more of each of these parameters may be adjusted according to the characteristics (e.g., thickness, size, density, etc.) and/or nature (e.g., face fiber type, materials used in secondary and primary backings, etc.) of the carpet 50 being recycled.

In some embodiments, the system 100 may include one or more sensors (not shown) capable of assessing one or more qualities of the carpet 50 being recycled, such as the thickness, size, density, face fiber type, and materials used in secondary and primary backings, etc. Input received from such sensors can be used to adjust, as needed, one or more system parameters (e.g., the rotational speed of the high speed abrasive drums 200a-f, the pressure applied by the high speed abrasive drums 200 and/or the screed devices 204a-f against the carpet 50, and the speed of the moving platforms 202a-j). Where one or more sensors are provided, the one or more sensors may be positioned in proximity to or in direct contact with the carpet 50 to be recycled as the carpet 50 is prepared for, positioned within, or processed by the carpet recycling system. Any sensor suitable for sensing and communicating information regarding the characteristics and/or the nature of the carpet 50 may be utilized. In particular embodiments, the one or more sensors may be coupled or associated with an automatic or programmable control system capable of automatically adjusting one or more system parameters in light of information received from the one or more sensors.

The speed at which the high speed abrasive drums 200a-f rotate may be varied to suit a particular application. In each embodiment, the speed of each high speed abrasive drum 200a-f may be set at a speed that effectively removes the desired carpet component without substantially removing or altering additional components. For example, the high speed abrasive drums 200a-f may be configured to rotate at a speed ranging from about 500-RPM to 10,000-RPM. In certain such embodiments, the high speed drums 200a-f can be selected and configured to rotate at a range of speeds selected from about 500-RPM to 7,500-RPM, about 500-RPM to 5,000-RPM, about 500-RPM to 3,500-RPM, about 500-RPM to 2,500-RPM, about 750-RPM to 7,500-RPM, about 750-RPM to 5,000-RPM, about 750-RPM to 3,500-RPM, about 750-RPM to 2,500-RPM, about 1,000-RPM to 7,500-RPM, about 1,000-RPM to 5,000-RPM, about 1,000-RPM to 3,500-RPM, and about 1000-RPM to 2,500-RPM. The high speed abrasive drums 200a-f may be operated at different speeds depending on one or more characteristics of the carpet 50 to be processed, including, for example, face fiber 20 type. In addition, the abrasive drums 200a-c used to abrade the secondary backing layer 40 may be operated at a different speed than the abrasive drums 200d-f used to abrade the face layer or face fibers 20. In some embodiments, a separate independently controlled drive motor with braking functionality may be provided for each of the plurality of abrasive drums 200a-f such that each of the abrasive drums 200a-f may be operated at different speeds and may be slowed or stopped independently of the others.

The amount of force to be applied by the high speed abrasive drums 200a-f and screed devices 204a-f may depend on, for example, the amount and qualities (e.g., the characteristics, such as thickness, size, density, etc., and/or nature, such as face fiber type, and materials used in secondary and primary backings, etc.) of the carpet 50 being processed. The amount of pressure applied by the high speed abrasive drums 200a-f and the screed devices 204a-f may also be adjusted according to the speed at which the high speed abrasive drums 200a-f rotate. In certain embodiments, the high speed abrasive drums 200a-f and/or screed devices 204a-f may apply a force selected from the following ranges: approximately 2 to 50 pounds of force per inch of carpet width; approximately 2 to 35 pounds of force per inch of carpet width; approximately 2 to 25 pounds of force per inch of carpet width; approximately 2 to 20 pounds of force per inch of carpet width; approximately 2 to 15 pounds of force per inch of carpet width; and approximately 2 to 10 pounds of force per inch of carpet width. In other embodiments, the high speed abrasive drums 200a-f and/or screed devices 204a-f apply a force selected from the following ranges: approximately 4 to 50 pounds of force per inch of carpet width; approximately 4 to 35 pounds of force per inch of carpet width; approximately 4 to 25 pounds of force per inch of carpet width; approximately 4 to 20 pounds of force per inch of carpet width; approximately 4 to 15 pounds of force per inch of carpet width; and approximately 4 to 10 pounds of force per inch of carpet width. In still further embodiments, the high speed abrasive drums 200a-f and/or screed devices 204a-f may apply a force selected from the following ranges: approximately 2 to 8 pounds of force per inch of carpet width; approximately 2 to 7 pounds of force per inch of carpet width; approximately 2 to 6 pounds of force per inch of carpet width; approximately 2 to 5 pounds of force per inch of carpet width; approximately 4 to 8 pounds of force per inch of carpet width; approximately 4 to 7 pounds of force per inch of carpet width; approximately 4 to 6 pounds of force per inch of carpet width; and approximately 4 to 5 pounds of force per inch of carpet width.

According to one or more embodiments, abrasive material 205 may be selected from any material suitable for abrading or sanding that is sufficiently flexible to wrap around a high speed abrasive drum 200a-f, including sandpaper, carbide grit, diamond grit, zirconium grit, abrasive cloth, hook and loop roll abrasive, and the like. In one embodiment, the abrasive material 205 comprises abrasive particles ranging from one of approximately 10-200 grit, 10-100 grit, 10-75 grit, 10-65 grit, 10-50 grit, 10-25 grit, 15-200 grit, 15-100 grit, 15-75 grit, 15-65 grit, 15-50 grit, 15-25 grit, 20-200 grit, 20-100 grit, 20-75 grit, 20-65 grit, 20-50 grit, and 20-25 grit. In a specific embodiment, the abrasive material 205 comprises abrasive particles ranging from approximately 24-60 grit. The high speed abrasive drums 200a-f may be machined out of a solid steel shaft and balanced to accommodate smooth operation at high speed, such that the abrasive material 205 can be quickly and easily replaced while maintaining drum balance and, therefore, low vibration, which works to provide improved bearing life and relatively low cost of operation. In an alternative embodiment, the high speed abrasive drums 200a-f may be replaced with one or more grinding wheels, one or more abrasive wire wheels or shafts, one or more shafts containing abrasive particles applied to, adhered to, or embedded within the surface of the one or more shafts, one or more shafts with removable sleeves containing abrasive particles applied to, adhered to, or embedded within the surface of the removable sleeves, or other suitable abrasive means that are configured for use in this context.

Though the system illustrated in FIGS. 5 through 7 is just one embodiment of a system 100 suited for recycling carpet 50 according to the present description, FIGS. 5 through 7 highlight that the methods described herein not only break carpet 50 down into the materials forming the primary carpet components, but the methods described herein also allow for the collection of the materials forming each of the primary components as discrete products. The materials collected may include little cross-contamination. For example, the face fibers 20 collected may include little to no material from the secondary backing 40 or primary backing 30. Additionally, the recovered primary backing 30 material may include little to no face fiber 20 or secondary backing 40 material. Each of the discrete products produced by the methods and systems described herein can, itself, be sold, transported, and used with little to no additional processing.

In view of the above, and with reference to FIGS. 6A and 6B, a method of processing carpet, fabric or other flexible sheet material having a face layer and at least one backing layer may be provided which includes: conveying the carpet 50, fabric or other flexible sheet material along a platform 202b; urging the carpet 50, fabric or other flexible sheet material into contact with the platform 202b; and simultaneously abrading a surface 52 of the carpet 50, fabric or other flexible sheet material. Urging the carpet 50, fabric or other flexible sheet material into contact with the platform 202b may include pressing the carpet 50, fabric or other flexible sheet material into contact with the platform 202b with a screed device 204a. Simultaneously abrading the surface 52 of the carpet 50, fabric or other flexible sheet material may include removing material from the surface of the carpet 50, fabric or other flexible sheet material with an abrasive device, such as, for example, a high speed abrasive drum 200a, which is located downstream of the screed device 204a. Pressing the carpet 50, fabric or other flexible sheet material into contact with the platform 202b with the screed device 204a and simultaneously abrading the surface 52 of the carpet 50, fabric or other flexible sheet material with the abrasive device (e.g., high speed abrasive drum 200a) may include creating tension in the carpet 50, fabric or other flexible sheet material in a region between the screed device 204a and the abrasive device. Pressing the carpet 50, fabric or other flexible sheet material into contact with the platform 202b with the screed device 204a and simultaneously abrading the surface 52 of the carpet 50, fabric or other flexible sheet material with the abrasive device (e.g., high speed abrasive drum 200a) may include floating or riding the screed device 204a on the surface 52 of the carpet 50, fabric or other flexible sheet material.

The method may further include adjusting a height differential between the screed device 204a and the abrasive device (e.g., high speed abrasive drum 200a) to selectively modify a depth of engagement of the abrasive device with the carpet 50, fabric or other flexible sheet material. Adjusting the height differential between the screed device 204a and the abrasive device may include manually or automatically adjusting the height differential. For example, in some instances, the screed device 204a may be manually lowered relative to the abrasive device to decrease the depth of engagement as the screed device 204a rides on the carpet 50 during operation, or manually raised relative to the abrasive device to increase the depth of engagement. Manual adjustment may include turning a jack screw or adjusting a telescoping member of the screed device 204a. In other instances, the screed device 204a may be automatically lowered relative to the abrasive device to decrease the depth of engagement as the screed device 204a rides on the carpet 50 during operation, or automatically raised relative to the abrasive device to increase the depth of engagement. Automatic adjustment may include, for example, sensing a thickness of a carpet 50 or carpet component and automatically adjusting a height of the screed device 204a based at least in part on the sensed thickness. Adjustment may be made via a powered lead screw, hydraulic or pneumatic cylinder or other mechanical actuator.

The method may further include sensing a location of the carpet 50, fabric or other flexible sheet material on the platform 202b, and thereafter engaging the carpet 50, fabric or other flexible sheet material with the screed device 204a to float on the surface 52 of the carpet 50, fabric or other flexible sheet material after a leading end of the carpet 50, fabric or other flexible sheet material has passed beneath the screed device 204a. Floating the screed device 204a on the surface 52 of carpet 50, fabric or other flexible sheet material may include floating the screed device 204a with sufficient mass to substantially prevent relative movement between the carpet 50, fabric or other flexible sheet material and the moving platform 202b as the surface of the carpet 50, fabric or other flexible sheet material is being abraded by the abrasive device (e.g., high speed abrasive drum 200a). As shown in FIGS. 6A and 6B, the abrasive device may be physically coupled to the screed device 204a to move in unison therewith as the carpet 50, fabric or other flexible sheet material is abraded by the abrasive device. In this manner, the depth of abrasion may be controlled by a relative height differential between the screed device 204a and the abrasive device (e.g., high speed abrasive drum 200a). In some instances, the height differential may be adjustable. In other instances, the height differential may be fixed. Additionally, in some embodiments, the screed device 204a may be fixedly attached to the frame 302 remote or apart from the abrasive device.

The method may further include conveying a plurality of pieces of carpet 50, fabric or other flexible sheet material along the platform 202b having non-uniform thickness and controlling a depth of abrasion for each of the plurality of pieces of carpet 50, fabric or other flexible sheet material via the screed device 204*a* based at least in part on a respective thickness thereof.

The method may further include capturing material abraded from the surface of the carpet 50, fabric or other flexible sheet material and routing the captured material in a direction transverse to a conveyance direction of the carpet 50, fabric or other flexible sheet material. For example, as shown in FIGS. 6A and 6B, material (e.g., aggregate mixture 45) may be propelled into a catch arrangement 402*a* located aft of the abrasive device (e.g., high speed abrasive drum 200*a*) as the abrasive device rotates at high speed and is brought into contact with the surface 52 of the carpet 50, fabric or other flexible sheet material. The material may be routed or directed to a transversely oriented conveyor device 404*a* for collection and subsequent processing of the abraded material. Simultaneously abrading the surface 52 of the carpet 50, fabric or other flexible sheet material may include removing material from at least one backing layer 40 or, in the alternative, the face layer comprised of face fibers 20.

The method may further include downloading the carpet 50, fabric or other flexible sheet material in an abraded condition to a secondary conveyor device 202*c* to assist in smoothing out the carpet 50, fabric or other flexible sheet material prior to subsequent processing thereof. Downloading the carpet 50, fabric or other flexible sheet material in this manner allows gravity to pull out wrinkles or other distortions in the carpet 50, fabric or other flexible sheet material that may arise from the abrasion process. In addition, the downstream conveyor device 202*c* may be controlled to operate at a higher velocity than the upstream conveyor device 202*b* such that the differential speed assists in pulling wrinkles or other distortions in the carpet 50, fabric or other flexible sheet material that may arise from the abrasion process.

The method may further include actuating a movable device 325*a* located downstream of the abrasive device into a position to assist in flattening out the carpet 50, fabric or other flexible sheet material prior to subsequent processing thereof. Actuating the movable device 325*a* may occur after a leading end of the carpet 50, fabric or other flexible sheet material passes the device 325*a* and may be coordinated with movement of the abrasive device into and out of engagement with the surface 52 of the carpet 50, fabric or other flexible sheet material.

The method may further include discharging a gas stream (e.g., pressurized air) to impinge on a leading end of the carpet 50, fabric or other flexible sheet material as the leading end clears the abrasive device. This may assist in preventing the carpet 50, fabric or other flexible sheet material from being drawn around or entangled in the abrasive device and may also assist in reducing or preventing significant wrinkles or distortions in the carpet 50, fabric or other flexible sheet material that may otherwise hinder subsequent processing thereof.

The method may further include suctioning material from an abraded surface of the carpet 50, fabric or other flexible sheet material and simultaneously preventing the carpet 50, fabric or other flexible sheet material from separating from a conveyor device 202*c* upon which the carpet 50, fabric or other flexible sheet material is transported. This may be accomplished using a vacuum system 403*a* located downstream of the abrasive device (e.g., high speed abrasive drum 200*a*) having an inlet 406*a* that is provided with a grate structure 408*a* or other device for preventing the carpet 50, fabric or other flexible sheet material from separating from a conveyor device 202*c* or contacting the inlet 406*a*. Suctioning material from the abraded surface of the carpet 50, fabric or other flexible sheet material may include activating and deactivating a vacuum system based at least in part on the position of the carpet.

Although some of the methods described above have been described with reference to the abrading unit 300*a* and other devices shown in FIGS. 6A and 6B, it is appreciated that embodiments of the methods described herein may be accomplished with a plurality of abrading units of the same or similar construction. For example, one method may include abrading a backing layer 40 of a carpet 50 with an upstream abrasive device 200*a-c* while the face layer (defined by face fibers 20) is in contact with a moving platform 202*b-d* and while a screed device 204*a-c* is riding on the backing layer 40, turning the carpet 50 material over, and abrading the face layer with a downstream abrasive device 200*d-f*. It is also appreciated that the methods may be accomplished with a variety of different abrasive devices, including the high speed abrasive drum 200 shown in FIGS. 8 and 9 and as described in further detail below.

Figure 8:
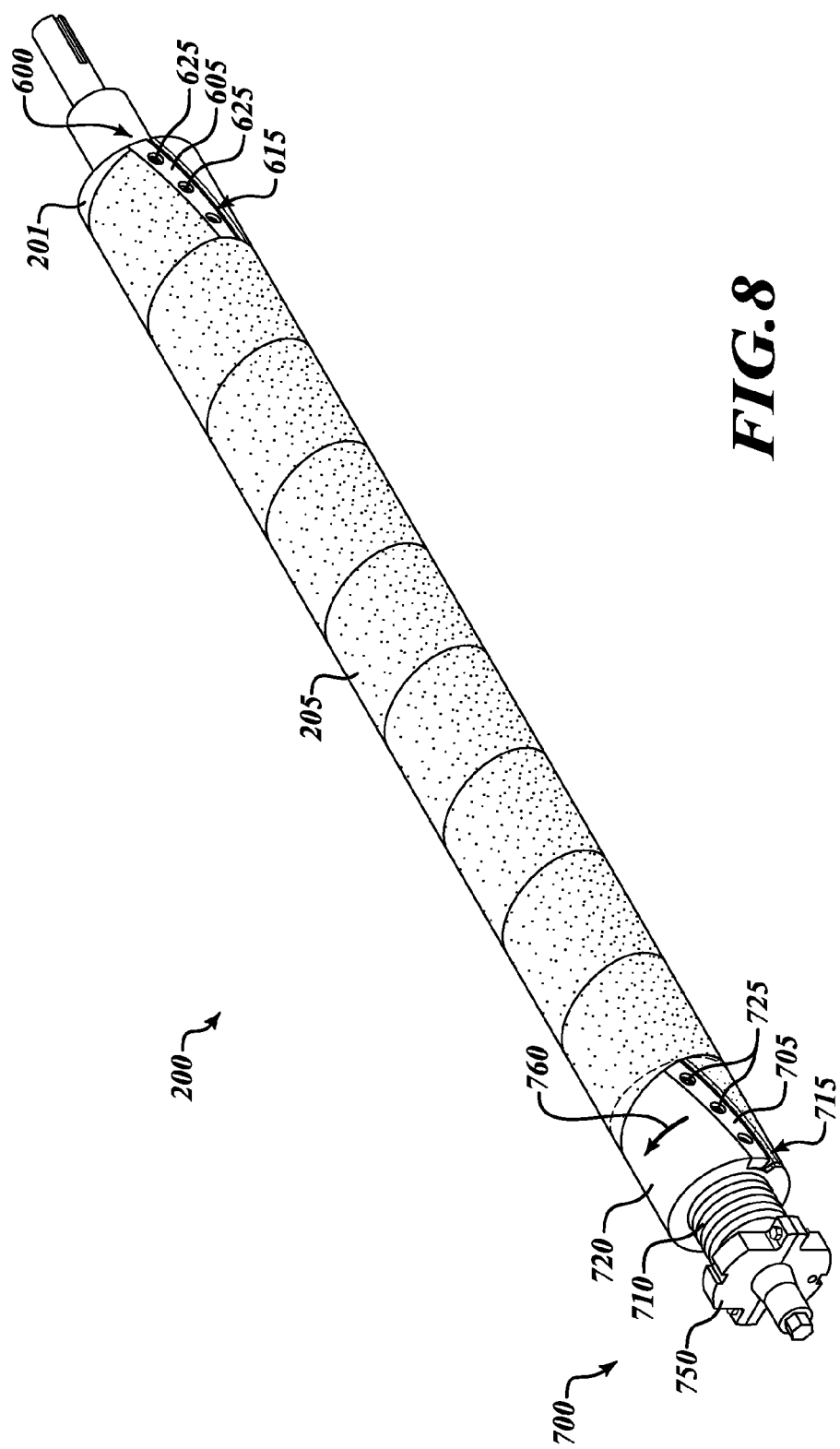
FIG. 8 is a perspective view of an embodiment of an assembled high speed abrasive drum 200 fitted with an abrasive material 205 that is spirally wrapped around the high speed abrasive drum 200.
Figure 9:
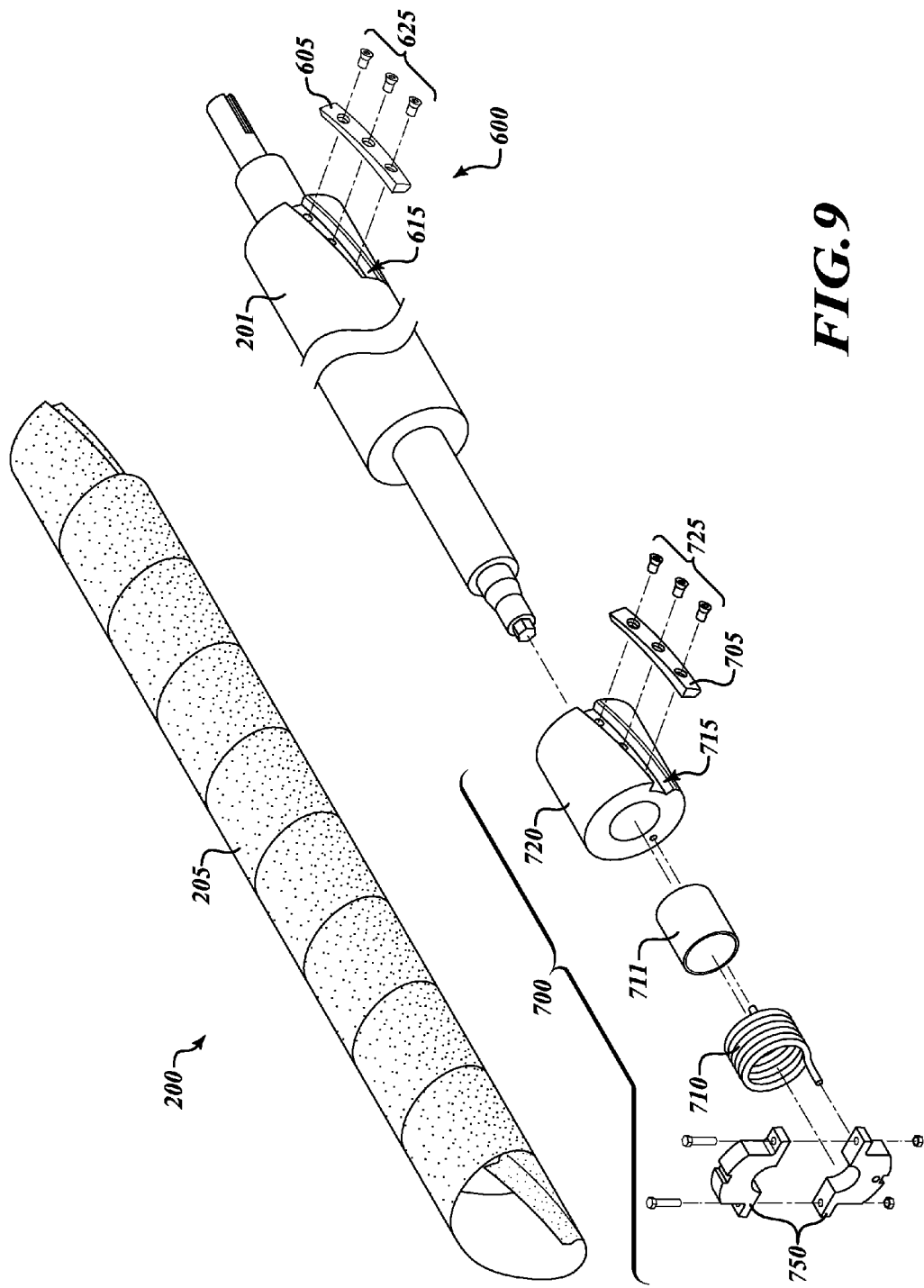
FIG. 9 is a perspective exploded view of the high speed abrasive drum 200 of FIG. 8.

FIGS. 8 and 9 illustrate a perspective view of an exemplary embodiment of an abrasive device in the form of a high speed abrasive drum 200 that can be used in the systems and methods described herein or to abrade other substrates. The high speed abrasive drum 200 is configured for receiving and securing an abrasive media sheet 205 thereto. As illustrated in FIGS. 8 and 9, the high speed abrasive drum 200 includes a cylinder 201 having a first end, a second end and an exterior surface extending therebetween. An abrasive media sheet 205 is anchored at the first end of the cylinder 201 with an abrasive retainer 600 and wrapped around the exterior surface. An adjustable attachment device 700 is also provided at the opposing second end of the cylinder 201 for coupling the abrasive media sheet 205 to the second end. The abrasive retainer 600 at the first end may include a retaining strip 605, a machined slot 615, and a fastening mechanism 625. Examples of such fastening mechanisms 625 may include screws, pins, and the like. The retaining strip 605 and fastening mechanism 625 may be inserted into the machined slot 615 located at the first end of the high speed abrasive drum 200 to secure one end of the abrasive media sheet 205 in place. The abrasive media sheet 205 may be wrapped around the high speed abrasive drum 200 toward the second end in a helical or spiral manner, as shown in FIG. 8.

As previously described, the opposing end of the abrasive media sheet 205 may be secured to the second end of the cylinder 201 by the attachment device 700. The attachment device 700 includes a biasing element 710, such as a torsional spring, which is arranged to urge the abrasive media sheet 205 into a taut condition around the exterior surface of the cylinder 201. A liner 711 may be provided to fit within the interior of the biasing element 710 and to surround a portion of the second end of the cylinder 201. The attachment device 700 further includes a sleeve 720 fixed to the abrasive media sheet 205 and rotatably supported on the second end of the cylinder 201. The abrasive media sheet 205 sheet may be fixed to the sleeve 720 using a retaining strip 705, a machined slot 715, and a fastening mechanism 725. Examples of such fastening mechanisms 625 may include screws, pins, and the like. The retaining strip 705 and fastening mechanism 725 may be inserted into the machined slot 715 to secure the opposing end of the abrasive media sheet 205 to the sleeve 720. The sleeve 720 may be rotatable about the second end of the cylinder 201 and the biasing element 710 may be arranged to urge the sleeve 720 rotationally about the second end of the cylinder 201 to maintain the abrasive media sheet 205 in the taut condition. In this manner, the attachment device 700 may take up slack dynamically as the abrasive drum 200 is used to abrade a wide variety of substrates, including, for example, carpet, fabrics or other flexible sheet materials.

The attachment device 700 may further include a collar 750 that is fixed to the second end of the cylinder 201 and coupled to the biasing element 710. The collar 750 may be a multi-piece clamping block with associated fasteners, as shown in FIGS. 8 and 9. The collar 750 may be selectively lockable to the cylinder 201 to enable setting of the bias applied to the sleeve 720 by the biasing element 710. For example, according to the example embodiment shown in FIGS. 8 and 9, the collar 750 may be temporarily secured to a machine frame or other foundation relative to which the cylinder 201 rotates during operation with the collar 750 in a loosened or unlocked configuration to enable the second end of the cylinder 201 to rotate within the collar 750. While holding the collar 750 static, the cylinder 201 may then be rotated via a crank or other means to tension the biasing element 710 which is located around a portion of the second end of the cylinder 201 between the sleeve 720 and the collar 750 with one end of the biasing element 710 being attached or otherwise coupled to the sleeve 720 and the opposing end of the biasing element 710 being attached or otherwise coupled to the collar 750. The collar 750 may then be moved to a locked configuration in which the collar 750 clamps down onto the second end of the cylinder 201 to subsequently rotate in unison therewith. The collar 750 may then be released or detached from the machine or other foundation to rotate with the cylinder 201 during operation. In this configuration, the biasing element 710, illustrated as a torsional spring, constantly urges the sleeve 720 rotationally about the cylinder 201 to maintain the abrasive media sheet 205 in a taut condition around the exterior surface thereof, as indicated by the arrow labeled 760 in FIG. 8. In other embodiments, it is appreciated that the cylinder 201 may be held static while the collar 750 is rotated about the cylinder 201 to load the biasing element 710.

In view of the above, a method of preparing an abrasive device (e.g., an abrasive drum 200) to abrade a surface of a substrate may be provide which includes attaching a first end of an abrasive media sheet 205 to a first end of a cylinder 201; wrapping the abrasive media sheet 205 around an exterior surface of the cylinder 201; and attaching a second end of the abrasive media sheet 205 to a second end of the cylinder 201 whereby a bias is applied to the second end of the abrasive media sheet 205 to urge the abrasive media sheet into a taut condition around the exterior surface of the cylinder 201. Attaching the second end of the abrasive media sheet 205 to the second end of the cylinder 201 may include securing the second end of the abrasive media sheet 205 to the second end of the cylinder 201 with a sleeve 720 that is rotatably supported by the second end of the cylinder 201 and rotationally biased about the second end of the cylinder 201 to urge the abrasive media sheet 205 into the taut condition. The method may further include adjusting a rotational position of a collar 750 about the second end of the cylinder 201 while coupled to a biasing element 710, and locking the collar 750 to the second end of the cylinder 201 to set and maintain the bias applied to the second end of the abrasive media sheet 205 by the biasing element 710. The bias may be applied to the second end of the abrasive media sheet 205 by a biasing element 710 in the form of a torsional spring, and attaching the second end of the abrasive media sheet 205 to the second end of the cylinder may include installing the torsional spring between the sleeve 720 and the collar 750. Advantageously, the abrasive media sheet 205 may be held taut during abrading activities despite elongation or distortion of the sheet 205. In addition, the tensioning arrangement may accommodate significant variations in the length of the abrasive media sheet 205 arising from manufacturing tolerances, for example.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

The materials recovered using the methods, systems, and devices described herein can be used for any purpose suited to the material recovered. Because the methods described herein facilitate the removal and isolation of individual components of the carpet 50 being recycled, the methods reduce the amount of additional processing required to prepare the materials for commercial sale and use as recycled materials for any one of a variety of applications. The methods also facilitate continuous processing activities that enable efficient and cost effective removal and isolation of individual carpet components.

Aspects of the various embodiments described above may also be combined to provide further embodiments. All of the U.S. patents, U.S. patent application publications, U.S. patent applications, foreign patents, foreign patent applications and non-patent publications referred to in this specification and/or listed in the Application Data Sheet, including U.S. provisional patent application No. 62/095,683, are incorporated herein by reference in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of processing carpet, fabric or other flexible sheet material having a face layer and at least one backing layer, the method comprising:
conveying the carpet, fabric or other flexible sheet material along a platform;
urging the carpet, fabric or other flexible sheet material into contact with the platform;
simultaneously abrading a surface of the carpet, fabric or other flexible sheet material with an abrasive device; and
discharging a gas stream to impinge on a leading end of the carpet, fabric or other flexible sheet material as the leading end clears the abrasive device.

2. The method of claim 1 wherein urging the carpet, fabric or other flexible sheet material into contact with the platform includes pressing the carpet, fabric or other flexible sheet material into contact with the platform with a screed device.

3. The method of claim 2 wherein the screed device is positioned upstream of the abrasive device.

4. The method of claim 3 wherein pressing the carpet, fabric or other flexible sheet material into contact with the platform with the screed device and simultaneously abrading the surface of the carpet, fabric or other flexible sheet material with the abrasive device includes creating tension in the carpet, fabric or other flexible sheet material in a region between the screed device and the abrasive device.

5. The method of claim 3, further comprising:
adjusting a height differential between the screed device and the abrasive device to selectively modify a depth of engagement of the abrasive device with the carpet, fabric or other flexible sheet material.

6. The method of claim 5 wherein adjusting the height differential between the screed device and the abrasive device includes manually or automatically adjusting the height differential.

7. The method of claim 2 wherein pressing the carpet, fabric or other flexible sheet material into contact with the platform with the screed device includes floating the screed device on the surface of the carpet, fabric or other flexible sheet material.

8. The method of claim 7, further comprising:
sensing a location of the carpet, fabric or other flexible sheet material on the platform, and
thereafter engaging the carpet, fabric or other flexible sheet material with the screed device to float on the surface of the carpet, fabric or other flexible sheet material.

9. The method of claim 7 wherein the platform is a moving platform and wherein floating the screed device on the surface of the carpet, fabric or other flexible sheet material includes floating the screed device on the surface of carpet, fabric or other flexible sheet material with sufficient mass to substantially prevent relative movement between the carpet, fabric or other flexible sheet material and the moving platform as the surface of the carpet, fabric or other flexible sheet material is being abraded.

10. The method of claim 7 wherein the abrasive device is physically coupled to the screed device to move in unison therewith as the carpet, fabric or other flexible sheet material is abraded by the abrasive device.

11. The method of claim 2, further comprising:
conveying a plurality of pieces of carpet, fabric or other flexible sheet material along the platform, the plurality of pieces being of non-uniform thickness; and
controlling a depth of abrasion for each of the plurality of pieces of carpet, fabric or other flexible sheet material via the screed device based at least in part on a respective thickness thereof.

12. The method of claim 1, further comprising:
capturing material abraded from the surface of the carpet, fabric or other flexible sheet material; and
routing the captured material in a direction transverse to a conveyance direction of the carpet, fabric or other flexible sheet material.

13. The method of claim 12 wherein simultaneously abrading the surface of the carpet, fabric or other flexible sheet material includes removing material from the at least one backing layer, and wherein capturing material abraded from the surface of the carpet, fabric or other flexible sheet material includes capturing backing layer material.

14. The method of claim 12 wherein simultaneously abrading the surface of the carpet, fabric or other flexible sheet material includes removing material from the face layer, and wherein capturing material abraded from the surface of the carpet, fabric or other flexible sheet material includes capturing face layer material.

15. The method of claim 1, further comprising:
downloading the carpet, fabric or other flexible sheet material in an abraded condition to a secondary conveyor device to assist in smoothing out the carpet, fabric or other flexible sheet material prior to subsequent processing thereof.

16. The method of claim 1, further comprising:
actuating a movable device located downstream of the abrasive device into a position to assist in flattening out the carpet, fabric or other flexible sheet material prior to subsequent processing thereof.

17. The method of claim 1, further comprising:
suctioning material from an abraded surface of the carpet, fabric or other flexible sheet material; and
simultaneously preventing the carpet, fabric or other flexible sheet material from separating from a conveyor device upon which the carpet, fabric or other flexible sheet material is transported.

18. The method of claim 1 wherein simultaneously abrading the surface of the carpet, fabric or other flexible sheet material includes removing material from the at least one backing layer with the abrasive device, and wherein the method further comprises:
moving the carpet, fabric or other flexible sheet material in an abraded condition toward a second abrasive device; and
further abrading the carpet, fabric or other flexible sheet material with the second abrasive device to remove more material from the at least one backing layer.

19. The method of claim 18, further comprising:
moving the carpet, fabric or other flexible sheet material toward a third abrasive device; and
further abrading the carpet, fabric or other flexible sheet material with the third abrasive device to remove yet more material from the at least one backing layer.

20. The method of claim 18 wherein moving the carpet, fabric or other flexible sheet material in the abraded condition toward the second abrasive device includes moving the carpet, fabric or other flexible sheet material at a rate higher than a rate at which the carpet, fabric or other flexible sheet material moves past the first abrasive device.

21. The method of claim 18, further comprising:
establishing a depth of abrasion associated with the first abrasive device to be the same or different than a depth of abrasion associated with the second abrasive device.

22. The method of claim 1 wherein simultaneously abrading the surface of the carpet, fabric or other flexible sheet material includes removing material from the at least one backing layer with the abrasive device while the face layer is in contact with the platform, and wherein the method further comprises:
after removing material from the at least one backing layer with the abrasive device, turning the carpet, fabric or other flexible sheet material over; and
abrading the face layer of the carpet, fabric or other flexible sheet material with a downstream abrasive device.

23. The method of claim 1, further comprising:
selectively adjusting a pressure with which the carpet, fabric or other flexible sheet material is urged into contact with the platform.

24. A system for processing carpet, fabric or other flexible sheet material having a face layer and at least one backing layer, the system comprising:
a platform upon which the carpet, fabric or other flexible sheet material is conveyed;
an abrasive device located adjacent the platform to abrade a surface of the carpet, fabric or other flexible sheet material as the carpet, fabric or other flexible sheet material passes beneath the abrasive device;

a screed device located adjacent the platform and upstream of the abrasive device to urge the carpet, fabric or other flexible sheet material into contact with the platform as the surface of the carpet, fabric or other flexible sheet material is simultaneously abraded by the abrasive device; and a series of nozzles located aft of the abrasive device and being positioned to discharge a gas stream to impinge on a leading end of the carpet, fabric or other flexible sheet material as the leading end clears the abrasive device.

25. The system of claim 24 wherein the screed device and the abrasive device are positioned relative to the platform and to each other to create tension in the carpet, fabric or other flexible sheet material in a region between the screed device and the abrasive device as the abrasive device engages the surface of carpet, fabric or other flexible sheet material to remove material therefrom.

26. The system of claim 24 wherein the abrasive device is movably coupled to the screed device to enable adjustment of a height differential between the screed device and the abrasive device.

27. The system of claim 24, further comprising:
an adjustment device coupled between the screed device and the abrasive device for adjusting a depth of engagement of the abrasive device with the carpet, fabric or other flexible sheet material.

28. The system of claim 24 wherein the screed device is arranged to ride on the surface of the carpet, fabric or other flexible sheet material as the surface of the carpet, fabric or other flexible sheet material is being abraded by the abrasive device.

29. The system of claim 24, further comprising:
a sensor to sense a position of the carpet, fabric or other flexible sheet material relative to the abrasive device; and
a controller communicatively coupled to the sensor and the screed device to selectively control engagement of the screed device with the surface of the carpet, fabric or other flexible sheet material based on the sensed position of the carpet, fabric or other flexible sheet material.

30. The system of claim 24 wherein the platform is a moving platform and wherein the screed device is arranged to float on the carpet, fabric or other flexible sheet material and is provided with sufficient mass to substantially prevent relative movement between the carpet, fabric or other flexible sheet material and the moving platform as the surface of the carpet, fabric or other flexible sheet material is abraded.

31. The system of claim 24 wherein the abrasive device is physically coupled to the screed device to move in unison therewith as the carpet, fabric or other flexible sheet material is abraded by the abrasive device.

32. The system of claim 24, further comprising:
a machine frame; and
a support structure movably coupled to the machine frame to support the abrasive device and enable the abrasive device to be moved into and out of an active position for abrading the carpet, fabric or other flexible sheet material as the carpet, fabric or other flexible sheet material passes beneath the abrasive device during operation.

33. The system of claim 32 wherein the support structure is pivotally coupled to the machine frame to pivot the abrasive device into and out of the active position and to pivot the screed device into and out of contact with the carpet, fabric or other flexible sheet material as the carpet, fabric or other flexible sheet material passes beneath the abrasive device during operation.

34. The system of claim 32, further comprising a movable counterweight coupled to the support structure for selectively adjusting an amount of pressure with which the screed device urges the carpet, fabric or other flexible sheet material into contact with the platform.

35. The system of claim 32 wherein the abrasive device and the screed device form a first abrading unit, and wherein the system comprises a series of successive abrading units including the first abrading unit.

36. The system of claim 35 wherein the platform is a first moving platform, and wherein the system comprises a cascading series of moving platforms including the first moving platform which define a processing path beneath the abrading units.

37. The system of claim 35, further comprising:
a device positioned downstream of the first abrading unit and in the vicinity of a moving platform associated with a second one of the series of successive abrading units, the device being movable between an active position, in which the device assists in flattening out the carpet, fabric or other flexible sheet material as the carpet, fabric or other flexible sheet material passes by the device, and an inactive position, in which the device is positioned away from the moving platform associated with the second abrading unit so as to not interfere with a leading end of the carpet, fabric or other flexible sheet material as the leading end of the carpet, fabric or other flexible sheet material passes by the device.

38. The system of claim 35 wherein the series of successive abrading units are arranged such that a first grouping of the abrading units are configured to abrade at least one backing layer of the carpet, fabric or other flexible sheet material and such that a second grouping of the abrading units are configured to abrade the face layer after at least one backing layer is abraded.

39. The system of claim 24, further comprising:
a catch arrangement positioned aft of the abrasive device to collect material abraded from the carpet, fabric or other flexible sheet material; and
a conveyor device positioned adjacent the catch arrangement to receive the collected material and being arranged to route the collected material in a direction transverse to a conveyance direction of the carpet, fabric or other flexible sheet material.

40. The system of claim 24, further comprising:
a vacuum device positioned downstream of the abrasive device to remove material from an abraded surface of the carpet, fabric or other flexible sheet material as the carpet, fabric or other flexible sheet material passes beneath an inlet of the vacuum device.

41. The system of claim 40 wherein the vacuum device includes a grate structure adjacent the inlet to prevent the carpet, fabric or other flexible sheet material from separating from a conveyor device upon which the carpet, fabric or other flexible sheet material is transported.

* * * * *